United States Patent
Byrne

[11] 3,849,645
[45] Nov. 19, 1974

[54] ATMOSPHERIC COMPENSATION RADIOMETER SYSTEM

[75] Inventor: Eugene C. Byrne, Hacienda Heights, Calif.

[73] Assignee: Actron Industries, Inc., Monrovia, Calif.

[22] Filed: June 8, 1973

[21] Appl. No.: 368,259

[52] U.S. Cl............... 250/209, 250/226, 250/574
[51] Int. Cl. ....... G01j 3/34, G01j 3/50, G01n 21/26
[58] Field of Search.................... 250/574, 226, 209

[56] References Cited
UNITED STATES PATENTS
3,499,159  3/1970  Carrier et al. ..................... 250/574

Primary Examiner—James W. Lawrence
Assistant Examiner—T. N. Grigsby
Attorney, Agent, or Firm—Marvin H. Kleinberg

[57] ABSTRACT

Radiometer samples are taken from two widely separated, narrow spectral bands and one broad spectral band encompassing the two selected narrow bands. The narrow bands are selected to be subject to atmospheric scattering only. All readings are made simultaneously through a single wide field view. The scattering component for one of the narrow band channels is computed and is used to compute the extinction coefficient for the same narrow band channel. Using this extinction coefficient and the output of the broad band channel, individual extinction coefficients are calculated for a plurality of the selected channels to calculate the scatter coefficient and the absorption coefficient, for those individual channels to derive the complete spectral signature of the field of view.

9 Claims, 6 Drawing Figures

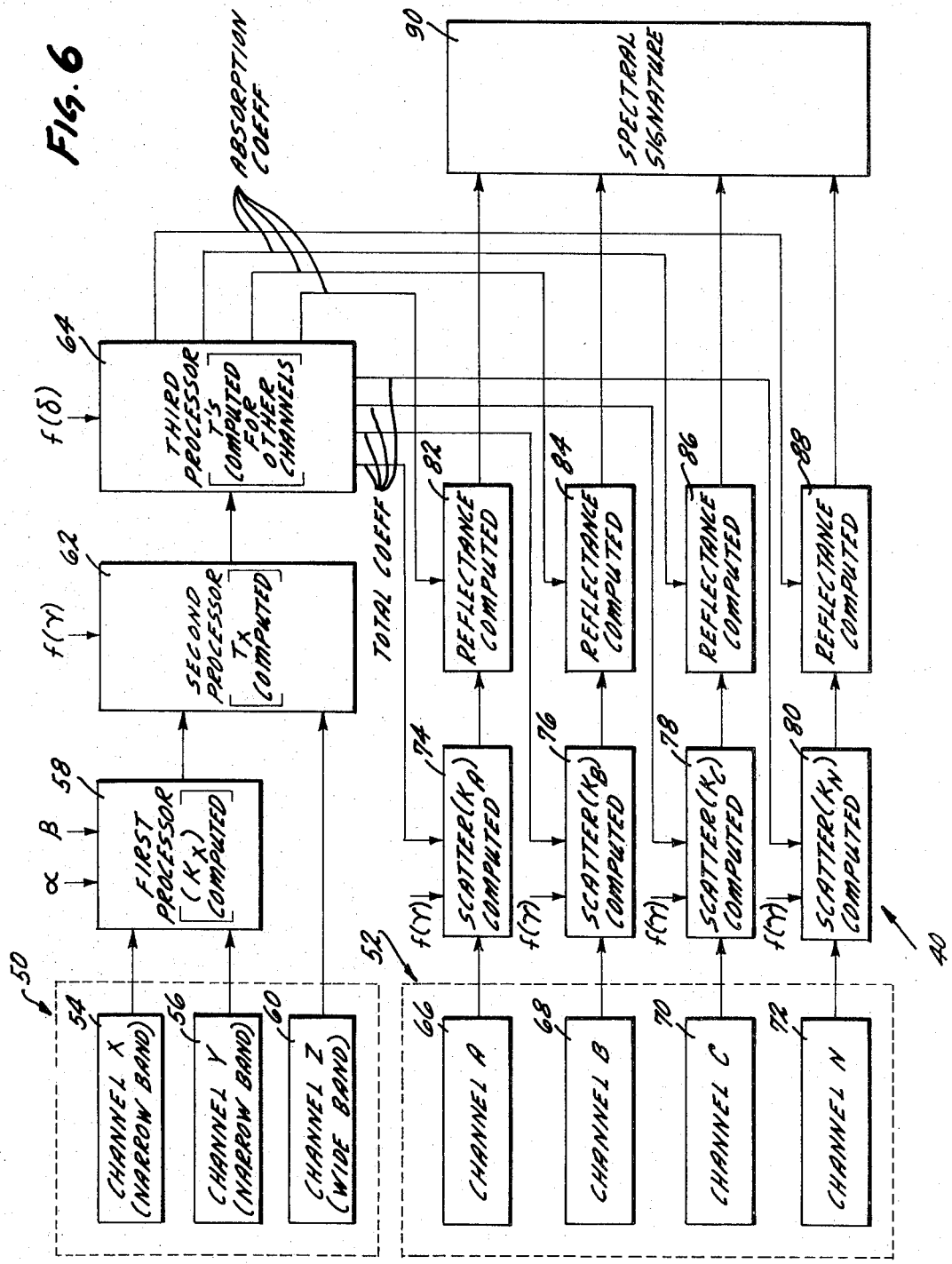

ATMOSPHERIC COMPENSATION RADIOMETER SYSTEM

BACKGROUND OF THE INVENTION

1. Field of the Invention

This invention is concerned primarily with remotely sensed signal data from targets located on the ground and, more particularly, with determining desired ground reflectance signals that cannot be directly measured, due to atmospheric scattering effects.

2. Description of the Prior Art

The advantage of remote sensing from a removed point is the ability to detect the nature of an object without actually encountering the object. The earliest form of remote sensing is photography, in which case the scene is recorded as one sees it on film that is sensitive to electromagnetic energy in the invisible range. For these applications electromagnetic energy is considered to travel as a bundle of waves having various wavelengths which vary from the longer wavelengths which include the infrared, microwave and radio short waves and longer waves to the progressively shorter wavelengths which include visible light, to the ultraviolet, X-rays and gamma rays.

Instrumentation systems exist that can produce photographs and images of electromagnetic energy distribution covering each part of the electromagnetic spectrum. These instruments include graphic cameras, scanning radiometers and radar and sonar systems. Each part of the electromagnetic energy spectrum is especially suitable for providing information about some aspect of the viewed world. For example, black and white aerial photography can now provide sufficiently accurate representations of objects from which can be derived measurements of size, shape and location of objects.

In photography, color enhancement, for example, increases the usefulness of the camera for the identification of rock, soil types, vegetation, surface water conditions and materials in houses, roads and other objects on the earth's surface.

Color, infrared photography is also used to record information in colors that are not true to nature in order to enhance and identify certain conditions of vegetation. For example, leaves of healthy plants generally have high reflectance in the infrared and are recorded as red to enhance the contrast with dead vegetation which appears as blue or green. Variations in the red coloration may indicate the presence of differing species or presence of disease or dying plants since the amount of reflectance varies with leaf structure and plant vitality.

Radiometers having a plurality of different channels are used to record and measure electromagnetic energy in the visible and near infrared and blue regions, to remotely determine temperature as a function of the reflectance of an object being measured. The measurement of temperature differences and mapping their distribution can reveal volcanic activity, underground fires, forest fires which may be normally obscured by smoke, animals and heated buildings. Variations in surface temperature distributions in water can aid in the discovery of springs and can trace the discharges into lakes, rivers and oceans. Further, such distributions can provide information on moisture conditions near the ground surface since variations in moisture affect surface temperature.

Unfortunately, the terrestrial atmosphere interferes with the remote sensing of signals in two principal ways. First, the atmosphere attenuates the radiation illuminating the target being measured. Second, the atmosphere causes unwanted radiation to be scattered in such a manner that the scattered radiation combines with the desired signal in such a manner that the desired and the undesired signals cannot be separated.

It has been recognized and well documented that the signal one obtains in the air from a remote object on the ground is a combination of a desired signal caused directly by the reflectance of the area being viewed and an undesired signal which depends on the characteristics of the atmosphere which tends to generate a scattering signal between the ground and the remote receiver. The scattering characteristics of the atmosphere is not constant and appears to be greater for shorter wavelengths.

SUMMARY OF THE INVENTION

This invention is concerned primarily with an apparatus and method for calculating and eliminating the undesired, atmospheric component of the received signal. In practicing the present invention, a radiometer having a substantially wide field of view of the order of 15° to 20° is used to measure the spectral energy in at least two widely separated narrow bands or channels and in at least one broad band or channel which encompasses the spectral frequencies of the two narrow bands.

The choice of the two narrow bands is considered critical since the bands chosen must be responsive only to scattering and not be responsive to absorption. In the preferred embodiment, two narrow bands centering on 0.475 microns and 1.025 microns were selected. The scattering component for one of the narrow band channels is calculated from the data received by the output of both of the narrow band channels.

The scattering component is then used to calculate the extinction coefficient for the same narrow band channel. Having calculated the extinction coefficient for one of the narrow band channels, and using the output of the broad band channel, it is now possible to calculate the extinction coefficients for a plurality of other selected channels to determine the complete spectral signature of the field of view.

Depending on the needs of the viewing system, a plurality of other spectrally limited channels located within the frequency range of the broad band channel are used to view the scene of interest. The plurality of channels view the same scene as the two narrow band channels and the single broad band channel. In a similar manner the scattering coefficient for each of the individual channels is calculated and, using the extinction coefficient previously calculated, the individual reflectance values are determined from the output of each of the plurality of channels to thereby determine the total spectral signature of the field of view.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 6 is a block diagram illustrating a method for continuously obtaining a true spectral signature from a plurality of channels using the information obtained from the radiometer of FIG. 2.

Figure 1:
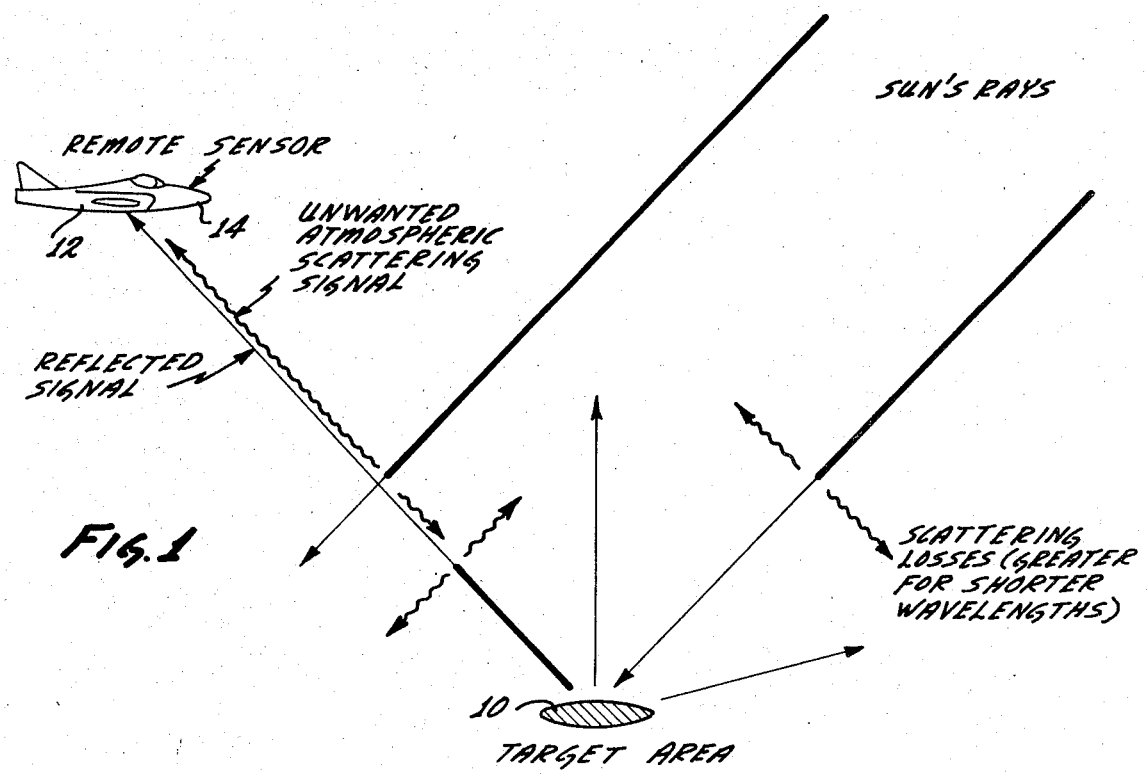
FIG. 1 is a schematic diagram illustrating the effects of the atmosphere on a reflected signal from the ground at a remote sensor.

Referring now to FIG. 1, there is shown a target area 10 located on the earth's surface and a remote sensor 12 in the form of a radiometer located in an aircraft 14. The remote sensor 12 located in the aircraft 14 collects signal data generated directly by ground reflectance signals.

Unfortunately, signals from the ground target area 10 which are received by the remote sensor 12 include not only the desired reflected signal from the target area 10 containing information about the target but also unwanted signals resulting from atmospheric effects such as scattering. These atmospheric effects interfere with the remotely sensed signal by spectrally attenuating the solar radiation reflected from the target area 10. Further, unwanted solar radiation is scattered in such a manner that the scattered radiation combines with the desired signal.

The desired signal and the scattered radiation signal received by the remote sensor 12 is combined in such a manner that the two signals cannot be separated or distinguished but rather are received as a single, integral signal. It should also be noted, as indicated in FIG. 1, that the scattering is usually greater at the shorter wavelengths than at the longer wavelengths. If there is an increase in the scattering effect, the difference between the desired signal and the signal that is actually received is substantial.

The signal received by the remote sensor 12 is therefore a combination of the desired signal and an unknown signal which depends on the characteristics of the atmosphere between the target area 10 on the ground and the remote receiver located in the aircraft 14. The teachings of the present invention are concerned primarily with apparatus and a method for reliably measuring and ultimately calculating the atmospheric component of the received signal.

Mathematical models have been developed which predict the level and spectral distribution due to atmospheric effects. These models have proven of little value in actual cases since the exact atmospheric constituents at any given time are seldom known at the remote sensor 12.

Even a perfectly clear atmosphere (free of aerosols) is subject to some scattering by the molecules of air. In this case, the result is predictable and is described by a "Rayleigh atmosphere." As aerosols become suspended in the air, the scattering no longer fits the Rayleigh model. If the size and distribution of the aerosols were known, then the scattering could be predicted according to various models that have been developed.

Unfortunately, the variability of the aerosols with time and place is so great that predictions are seldom accurate. The problem is solved according to the present invention, however, by measuring to determine the scattering effect at the same time the total reflected signal and scattered signal is received by the remote sensor, regardless of the type of atmosphere present.

Figure 2:
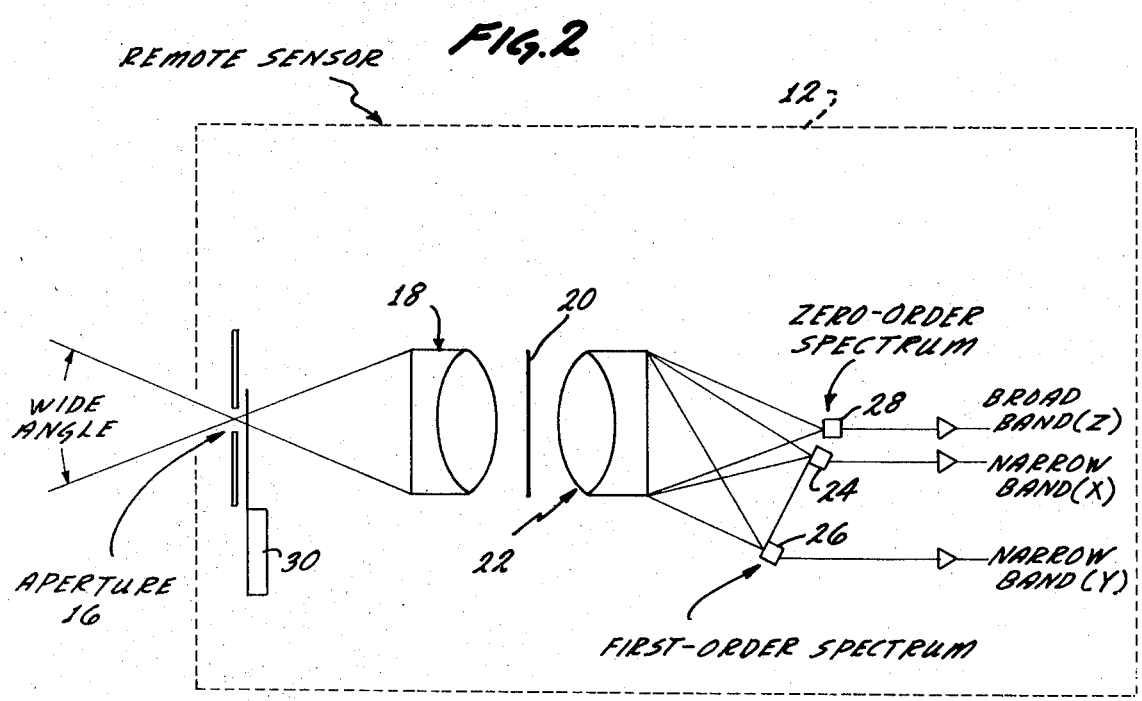
FIG. 2 is a schematic diagram illustrating a preferred embodiment of a remote sensor radiometer.

Referring now to FIG. 2, there is shown a radiometer remote sensor 12 capable of viewing a target area and deriving from the received radiation sufficient information for calculating the effects of the atmosphere in the detected signal.

The remote sensor 12 is basically a radiometer having a small aperture 16 for viewing the target area 10 through a field of view of approximately 15° to 20°. A first lens 18 views the scene through the small aperture 16. There is no collecting lens in the normal sense and hence the aperture 16 serves as the entrance aperture to a spectrometer. The first or viewing lens 18 collimates the energy passing through the aperture 16, which is fed through a transmission grating 20 at normal incidence. An objective lens 22 focuses the frequency spectrum off-axis, according to the optical parameters of the system. The objective lens 22 also focuses the zero order spectrum (on-axis) of the grating 20.

In the preferred embodiment, X and Y silicon detectors 24 and 26, respectively, are placed at predetermined locations to receive selected portions of the first order spectrum (off-axis) for individually detecting the spectral energy in a pair of widely spaced, narrow bands (X and Y).

A similar (Z) detector 28 is located at the zero order or on-axis focus of the objective lens 22, in order to detect a broad band (Z) of spectral energy, which encompasses the narrow bands covered by (X and Y) detectors 24 and 26.

In the illustrated embodiment, a tuning-fork light chopper 30 is located in close proximity to the aperture 16 to "chop" the incoming energy at an appropriate frequency to remove the 1/f noise components of the system. The optics utilized are well known to those skilled in the art and it will be recognized that other devices such as a motor driven chopper could be used for the tuning fork chopper 30. Appropriate electrical filtering may also be used to limit the noise to any desired band width.

The system of FIG. 2 senses the radiant energy in at least two, widely separated, spectral bands X and Y with X, Y detectors 24 and 26, respectively. The selection of the portion of the spectrum for bands X and Y is considered critical for reasons to be described below. In the preferred embodiments band X was centered on a wavelength of 0.475 microns and band Y was centered on a wavelength of 1.025 microns. The narrow bands each encompassed approximately 0.05 microns.

Figure 3:
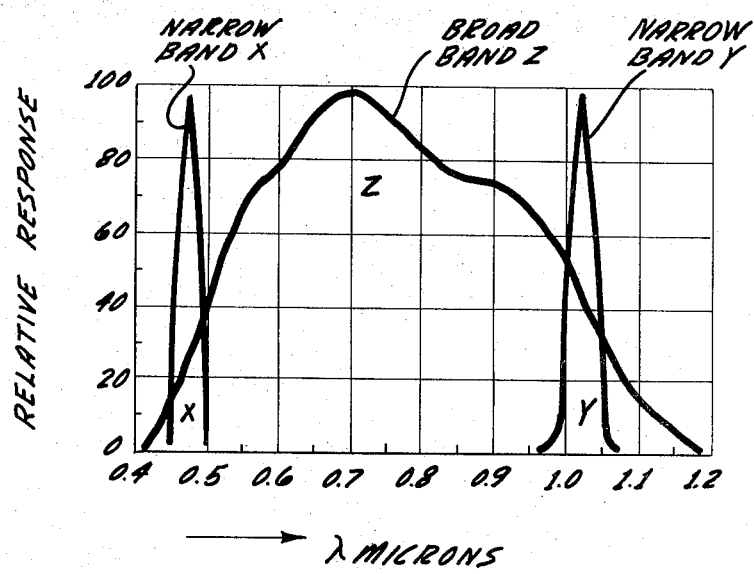
FIG. 3 is a graph illustrating the relative responses of the filters of the system illustrated in FIG. 2.

The Z detector 28 covers the entire spectrum between 0.42 and 1.2 microns, and includes bands X and Y, as shown in FIG. 3. In the apparatus of FIG. 2, the field of view was 15°.

Figure 4:
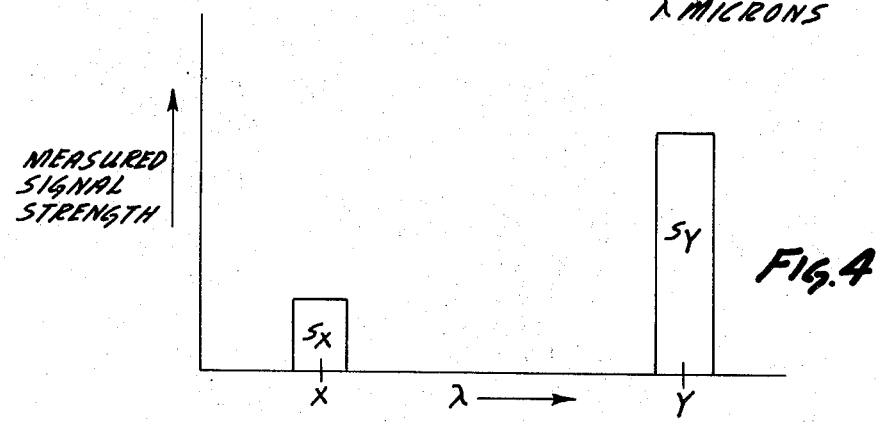
FIG. 4 is a graph illustrating relative signal strength at different wavelengths without the effect of atmospheric scattering.

Referring now to FIG. 4, there is shown a graph which illustrates the magnitude of the narrow band signals received without scatter by the two widely separated X and Y detectors of FIG. 2. The signal $S_x$ is representative of a scatter free signal received by the X detector 24 and the signal $S_y$ is representative of a scatter free signal received by the Y detector 26.

Under these conditions, there is some unknown but constant $\alpha$ such that:

$$\alpha S_x/S_y = 1 \quad (1)$$

Figure 5:
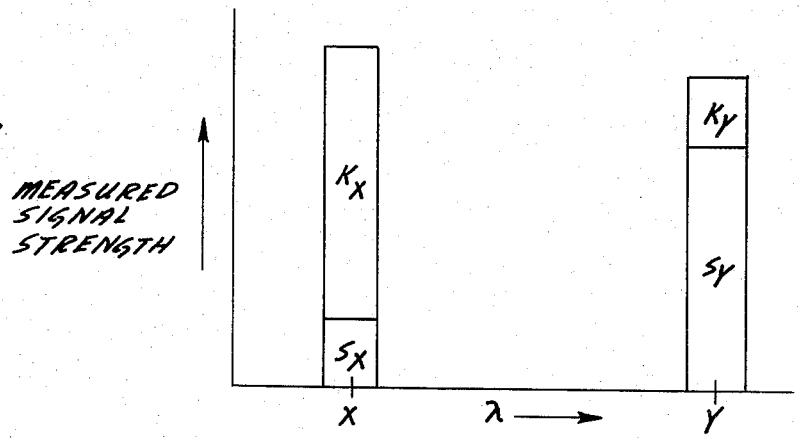
FIG. 5 is a graph illustrating relative signal strength at different wavelengths as affected by atmospheric scattering.

Unfortunately, as shown in FIG. 5, the real world output from the X detector and the Y detector will each include a scattered light component $K_x$ and $K_y$, respectively.

Under these conditions equation (1) must be rewritten as follows:

$$\alpha S_x/S_y \neq 1 \quad (2)$$

Equation (1) can be rewritten to include the scattered component $$\alpha[S_x - K_x]/S_y - K_y = 1 \quad (3)$$

and solving for the scattered component, $$\alpha K_X - K_Y = \alpha S_x - S_y \quad (4)$$

In addition to the conditions stated in equation (1), there exists some other constant $\beta$ such that:

$$\beta = K_Y/K_X \quad (5)$$

Substituting equation (5) into equation (4) and solving for $K_X$, one derives $$K_X = \alpha S_X - S_Y/\alpha - \beta \quad (6)$$

Due to the variability of nature, $\alpha$ and $\beta$ are not constant. Hence, this equation is an approximation, and the degree of error involved depends upon the accuracy with which $\alpha$ and $\beta$ can be approximated. The accuracy of $\alpha$ and $\beta$ depends in part upon which two spectral channels are selected.

The selection of the center frequency for each of the bands X and Y is critical to the practice of the invention and is based upon certain observable data in nature. It is known that scattering varies inversely with wavelength and is always greater at the shorter wavelengths. This fact allows a reasonable estimate to be made of the shape of the scattering curve for conditions under which data could not normally be obtained. A second determining factor in the selection of the individual narrow bands X and Y is that relative signal power is greater and scattering power least for conditions of a Rayleigh atmosphere. In other words, as the atmosphere departs from Rayleigh conditions, the relative signal power decreases and the scattering power increases.

Ideally, the selection of the narrow bands X and Y is made when the detected signals from each of the narrow bands are subject to scattering signals only. In addition, the two narrow band channels should be widely separated spectrally. The scatter component in the lower wavelength channel (X) should be much larger than the scatter component in the higher narrow band channel (Y). In other words, $K_x$ should be much larger than $K_Y$.

The ratio of reflectances in the two spectral bands X and Y is maintained as a constant by the use of a wide field of view that integrates reflection over a large viewing area. It is for this reason that the substantially large field of view of the order of 15° to 20° is recommneded in apparatus such as is illustrated in FIG. 2.

It has been noted that spectral reflectance usually follows a definite trend in that a high reflectance in one spectral band (compared to some average) tends to be high in all spectral bands and, conversely, a low spectral reflectance in one band tends to be low in all other bands. It is for this reason that the constants $\alpha$ and $\beta$ as set forth in Equations (2) and (5) as constants only for one band may be calculated and interpolated for other bands.

The radiometer described and illustrated in FIG. 2, utilizes the signal information received in each of the narrow band channels to compute a value of the scatter component $K_x$ set forth in equation (6).

The validity of the equation (6) and the assumed values of $\alpha$ and $\beta$ may be determined by calculating the fractional error $dK_x/K_x$ of equation (6) which can be shown to be as follows:

$$dK_x/K_x = 0.25 \, d\alpha/\alpha + 0.024 \, d\beta/\beta \approx 0.25 \, d\alpha/\alpha \quad (7)$$

Under these conditions, a 20 percent change in $\alpha$ will result in only a 5 percent change in $K_x$ whereas a 20 percent change in $\beta$ would result in only a 0.5 percent change. This would suggest that extreme accuracy in the values of $\alpha$ and $\beta$ is not required for the calcuation of $K_x$.

The actual calculation of $K_x$ is achieved by selecting an appropriate existing model of the atmosphere, for example, the Rayleigh and USAF standard atmosphere. The following equation appears to properly express the desired signal component $S_x$ and the scatter component $K_x$ in a single equation as follows:

$$W_x = S_x + K_x \quad (8)$$

where $$S_x = H_x \cdot \cos\theta \cdot R_x \cdot e^{-T_x \cdot (\sec\theta + c)} \quad (9)$$

and $$K_x = H_x \cdot [f(\gamma)] \cdot [1 - e^{-T_x (\sec\theta + c)}] \quad (10)$$

where
$W_x$ is total received signal in channel X
$H_x$ is a calibration constant for band X
$R_x$ is the reflectance in band X
$T_x$ is the extinction coefficient for band X
$\theta$ is the solar zenith angle
$c$ is the equivalent attenuation air mass from the target to the receiver
$f(\gamma)$ is the scattering function $S_x$ is the X signal component
$K_x$ is the X scatter component Equations (8, 9 and 10) contain many assumptions such as the viewing system is nadir centered, that is centrally located and looking straight down at the target area, with the perpendicular line being the shortest dimension. Further it is assumed that the scattering component $K_x$ is equal to the value derived in equation (6). The expressions of equations (9) and (10) assume attenuation by scattering, that absorption is negligible and that all energy failing to reach the target because of scattering contributes to the scattering function.

By way of review, therefore, it can be shown that $W_x$, which is the total received signal in channel X is read by the radiometer of FIG. 2. By properly assuming values of $\alpha$ and $\beta$ it is now possible by using equation (6), to calculate a value for $K_x$. The signal component $S_x$ can then be calculated by using equations (8) and (9).

From equation (6) in the expression for $K_x$ in equation (1) can now be used to calculate the extinction coefficient $T_x$ as follows:

Rewriting the expression of $K_x$ from equation (10) and solving for $T_x$ as follows:

$$T_x = -\ln[1 - (K_x/H_x f(\gamma_x))]/\sec\theta + c \quad (11)$$

Solving equation (11) for $T_x$, it is now possible to determine the extinction coefficient at wavelength X, and therefore the extinction coefficient at any other wavelength can be determined by a proper ratioing technique.

A ratioing technique has been suggested by A. Gutterman in *Applied Optics* 12377 (December 1968), where the measured extinction coefficients always showed a wavelength dependence similar to the combined model atmosphere as explained by L. Elterman in *Atmospheric Continuation Model* 1964 (AFCRL-67-740). In addition, it has been found that the calculated value generally fell somewhere in between the combined model atmosphere and the Rayleigh atmosphere.

Having determined the extinction coefficient at wavelength X, it is now possible to determine the total coefficient ($T_T$) and the absorption coefficient ($T_A$) at other selected wavelengths. With these two coefficients, the atmosphere can now be completely described.

For other spectral bands, attenuation is always present and equation (8) must be rewritten as follows:

$$W_\lambda = S_\lambda + K_\lambda \quad (12)$$

or:

$$W = H_\lambda/\pi \cos\theta R_\lambda e^{-T_t\lambda (\sec\theta + c)} + H\lambda/4\pi$$
$$[f(\gamma_\lambda)][1 - e^{-T_s\lambda (\sec\theta + c)}]e^{-T_a\lambda (\sec\theta + c)} \quad (13)$$

where:
$W_\lambda$ is the received signal in band $\lambda$
$H_\lambda$ is the calibration constant for band $\lambda$
$\theta$ is the solar zenith angle
$R_\lambda$ is the reflectance in band $\lambda$
$T_{t\lambda}$ is the total extinction coefficient at $\lambda = T_{a\lambda} + T_{s\lambda}$
$T_{a\lambda}$ is the absorption extinction coefficient at $\lambda$
$T_{s\lambda}$ is the scattering extinction coefficient at $\lambda$
$f(\gamma_\lambda)$ is the scattering function at $\lambda$
C is the equivalent attenuation air mass from the target to the receiver A complicated part of equation (13) is the scattering function $f(\gamma_\lambda)$ where the angle $\gamma$ is the sun target receiver angle and is defined as:

$$-\cos\gamma = -\sin\theta\sin\delta\cos\phi + \cos\theta\cos\sigma \quad (14)$$

where,
$\theta$ = solar zenith angle
$\delta$ = nadir viewing angle
$\phi$ = receiver-target-sun azimuth angle measured from the sun position The actual scattering function is determined empirically, however, it does seem to resemble certain of the polar diagrams used for antenna patterns. Some of the various equations that have been used for this function are:

| | | |
|---|---|---|
| $1 + \cos^2\gamma$ | Rayleigh Atmosphere | (15) |
| $1 + p\cos\gamma + q\cos^2\gamma$ | Schoenberg Approximation | (16) |
| $1 + p_\lambda f(\gamma) + Q\cos^2\gamma$ | Krat Approximation | (17) |
| $\sigma_R(1 + \cos\gamma) + \sigma_\lambda[1 + k(e^{-3}\gamma - 0.009)]$ | Livshitz Approximation | (18) |
| $1 + a\cos\gamma + b\cos^2\gamma + c\cos^3\gamma$ | Ferisenkov Approximation | (19) |

Referring now to FIG. 6 there is shown a complete block diagram illustrating a flow chart and the data reduction processes necessary to determine the individual extinction coefficients required for obtaining the total spectral signature of the viewing area.

A complete system 40 for remotely viewing a target area on the earth includes a haze radiometer portion 50 similar to that of FIG. 2, which is used to obtain data for calculating the atmospheric portion of a remotely sensed signal. Also included is a multispectral radiometer portion 52, having a plurality of desired channels for viewing the work area from which the atmospheric portion is subtracted, leaving only the desired signal.

The haze radiometer portion 50, more fully illustrated in FIG. 2, includes an X narrow band channel 54 and a Y narrow band channel 56, centered respectively on 0.475 microns and 1.025 microns. The signal output of the X channel 54 and the Y channel 56 is processed with values for $\alpha$ and $\beta$ for calculating $K_x$ in a processor 58. The calculation is in accordance with equation (6) and may utilize analog techniques. Digital techniques may be employed if suitable conversion circuits are provided.

The output of processor 58 which represents a value of $K_x$ is combined with the output of a wide band Z channel 60 within the haze radiometer portion 50 and with a scatter function $F(\gamma)$ at second processor 62 for which calculates the attenuation constant $T_x$ in accordance with equation (11). The output of processor 62 is fed to a third processor 64, together with a scattering function $f(\delta)$ if the "look angle" is different for each radiometer. The third processor 64 calculates a total coefficient and absorption coefficients for a plurality of additional channels.

Depending upon the needs of the scene being viewed, there is included in the multispectral radiometer portion 52, a plurality of additional, narrow band A – N, channels 66, 68, 70 and 72, respectively, each capable of passing a different narrow band of wavelengths within the spectrum. The output of each A – N channel 66, 68, 70 and 72 is fed to an associated processor 74, 76, 78 and 80, respectively, where a value of K for each of the channels is separately calculated using an equation similar to equation (10) employing the outputs of the individual extinction coefficients which are calculated in the second processor 64. The individual reflectances are computed in individual processors 82, 84, 86 and 88, respectively, by using the individual K values calculated for each of the individual channels and the individual extinction coefficients calculated in second processor 64 employing an equation similar to equation (13). The individual outputs of processors 82, 84, 86 and 88 are the absorption coefficients for each of the individual channels and, taken together, define the complete spectral signature as produced by the processor 90.

It will be appreciated by those skilled in the art that the individual coefficients may be calculated in real time with the signal being detected in the individual channels or the information may be recorded in timed sequence with the calculations being made at some later time as a part of playback and analysis of the record.

While the individual processors have been merely set forth as boxes, it is within the skill of the art to create suitable data processing circuits to mechanize the equations derived above. As noted earlier, both analog and digital mechanizations are available to solve for the various unknowns.

Thus there has been shown apparatus for generating some of the constants required in the analysis of radiation received through the atmosphere from a remote target. Since the atmosphere constantly changes, it is important to have method and apparatus available for analysis that operates concurrently with the information gathering activity.

What is claimed as new is:

1. In combination:
   a radiometer having a wide field of view for measuring spectral energy in a given band of frequencies;

first detecting means for measuring the spectral energy in at least two spaced-apart narrow bands, within said band of frequencies;
   each of said narrow bands being affected differently by atmospheric scattering of radiation;
   second detecting means for measuring the spectral energy in a broad band encompassing the given band of frequencies and including both of said narrow bands;
   first processing means responsive to said first detecting means for determining the atmospheric scattering coefficient for spectral energy at the wavelengths received by a one of said narrow bands; and second processing means coupled to said first processing means for correcting the spectral energy measured in said broad band by said determined scattering coefficient, to calculate the extinction coefficient of the atmosphere for that spectral band.

2. The combination of claim 1 in which said radiometer simultaneously measures the spectral energy in said narrow bands and said broad band.

3. A combination according to claim 1 in which said narrow bands encompass spectral energy in the "blue" and "red" spectral regions, respectively.

4. A combination according to claim 1 in which one of said narrow bands has a band width of 0.05 microns and said first detecting means receive spectral energy centered at 0.475 microns.

5. A combination according to claim 4 in which the atmospheric scattering coefficient is determined for the narrow band located at 0.475 microns.

6. A combination according to claim 1 in which said radiometer field of view approximates at least 15° for averaging the atmospheric effects upon the detected radiation.

7. A combination according to claim 1 which includes a plurality of independent bands for measuring different frequencies of spectral energy in said same field of view;
   third processing means coupled to said second processing means for calculating the extinction coefficient and the absorption coefficient for each of said plurality of bands from the atmospheric scattering coefficient determined for said one of said narrow bands;
   additional detecting means in each of said plurality of independent bands responsive to the spectral energy within each of said plurality of bands; and
   additional processing means coupled to said detecting means, and said processing means for calculating spectral energy attributable to sources other than scattering in each band.

8. A method for measuring a field of view of detected energy and for determining the energy component reflected from a remote target, comprising the steps of:

a. measuring the total received spectral energy in two, spaced-apart narrow frequency bands that exhibit different responses to scattering only;
   b. calculating the scattering coefficient for one of said narrow bands;
   c. simultaneously measuring the spectral energy in a broad band including said narrow bands; and
   d. calculating the extinction coefficient for said one narrow band using the scattering coefficient calculated for said one narrow band,
   whereby said calculated scattering and extinction coefficients can be utilized to calculate the component of spectral energy attributed to reflection.

9. The method of claim 8 further including the steps of:
   e. simultaneously measuring spectral energy in a plurality of selected narrow bands;
   f. calculating the total extinction coefficient and the absorption coefficient for each of said plurality of selected bands from the calculated coefficients for the said one narrow band; and
   g. adjusting the received signal in each of said plurality of bands by the calculated coefficients to determine a total spectral signature of the field of view.

* * * * *